3,335,088
METHOD OF STRIPPING RESINS
Harry C. Mandell, Jr., Abington, Pa., assignor to Pennsalt Chemicals Corporation, Philadelphia, Pa., a corporation of Pennsylvania
No Drawing. Filed Dec. 20, 1965, Ser. No. 515,156
4 Claims. (Cl. 252—143)

This invention relates to new compositions and methods for the removal of resins adhering to substrates and containers. More particularly, the present invention relates to the use of anhydrous hydrofluoric acid and anhydrous hydrofluoric acid containing compositions for the removal of resin coatings, glues, foams and encapsulating media, especially those which are epoxy or urethane-based.

This application is a continuation-in-part of my co-pending application, Ser. No. 294,226, filed July 11, 1963, now abandoned for chemical compositions and methods for their use.

The organic solvent compositions such as methylethylketone, turpentine, naphtha, etc. ordinarily used in the removal of coatings and adherent resins are sufficiently numerous and well known to make their discussion extraneous. Also well known is the general class of alkali-based paint removing compositions. The numerous additives and improvements in this field are typified by the compositions disclosed and claimed in United States Patent 2,962,395 issued to Lewis J. Brown in 1960. Less widely used compounds for the removal of more resistant coatings include small amounts of organic acids, notably formic acid, or lactic acid. These are exemplified by the lactic acid formulation disclosed in United States Patent 2,418,138 issued to Howard Packer.

A major portion of the demand for more effective coating removal agents originates in the field of air transportation, both military and civilian. Increases in the altitude and speed of aircraft, space vehicles and capsules have required exterior surface coatings with greater resistance to abrasion and high temperatures, met largely by the use of epoxy- and urethane-based coatings which have a relatively high degree of cross linkage.

These highly cross linked resins have themselves posed a second problem. In the maintenance of military and commercial aircraft, it is necessary to remove all exterior paint at regular intervals in order to permit close inspection of the underlying surfaces for defects. Periodic removal and repainting is also necessary on certain spacecraft in order to maintain a highly reflective coating as a protection against radiant heat.

The organic solvent type of commercial paint stripper is almost entirely ineffective in removing these new, highly resistant coatings, and none of the alkaline strippers remove the highly cross-linked coatings with sufficient efficiency to permit their commercial application. The most active of the organic acid type paint removers barely softens these coatings.

In military applications, the highly resistant coatings are generally applied to metallic substrates and particularly to substrates of aluminum, steel, magnesium and alloys thereof. Most of such substrates are finished to close tolerances and even minor corrosion would render them unfit for their intended use. In the course of the development of the present invention, a wide variety of chemical compounds was applied to coatings of epoxy and urethane resins supported on metallic substrates. Except for the compositions of the present invention, and for one other type of composition which will be claimed in a forthcoming application, every compound which was sufficiently active to attack the resistant coatings also caused severe corrosion of the metallic substrates.

According to this invention, it has been found that such highly resistant resin coatings are removed rapidly and effectively without appreciable corrosion of metal or other substrates by means of substantially anhydrous compositions comprising an intimate mixture of hydrofluoric acid with an organic solvent which, at ordinary temperatures, is in the liquid state, is capable of softening the resin coating, and is not appreciably attacked by hydrofluoric acid. By substantially anhydrous it is meant that the compositions contain not more than about 3% by weight and preferably less than about 1% by weight of water. The preferred percentage of hydrofluoric acid in the solvent system will be from about 0.05 to 20% by weight, with the range from 1.0 to about 10% being most preferred. However, the concentration of hydrofluoric acid is not narrowly critical and higher or lower concentrations may be found convenient under special circumstances.

By ordinary temperatures are meant environmental temperatures, i.e. the temperature of the room or other environment where the paint stripping operation is carried out.

While the invention is not limited to any particular theory as to the mechanism by which the stripping compositions of the invention operate, it is believed that the solvent operates to swell and soften the resin coating, whereupon the hydrofluoric acid is permitted to diffuse through the softened coating and to directly attack the bond between the resin and the substrate. Support for this mechanism of action may be drawn from the fact that the resin tends to be stripped from the substrate in large pieces, indicating an attack on the substrate-resin bond, rather than undergoing disintegration, as would be the result if the main attack occurred by disintegration of the resin coating itself.

In general any inert organic solvent may be employed which, at ordinary temperatures, is in the liquid state, is capable of softening the resin coating, and which is not appreciably attacked by the hydrofluoric acid. In addition to these characteristics, the solvent employed should also preferably have a low vapor pressure so as to avoid excessive fuming of the composition. For this reason, solvents boiling above about 100° F. are preferred. From the standpoint of cost, their effectiveness in softening the resin coating and their resistance to attack by HF, the preferred general types of inert organic solvents for use in the invention are chlorine substituted hydrocarbons, both aliphatic and aromatic and aromatic hydrocarbons.

Of a wide variety of solvents studied, a class combining good resin softening properties, a high degree of inertness to HF and low cost is the class consisting of alpha, omega dichloroalkanes, that is, compounds consisting only of chlorine, carbon and hydrogen atoms in which a chlorine atom is attached only to the terminal carbon atoms at each end of the molecule. The lowest molecular weight compound in this class is dichloromethane, more commonly called methylene chloride. Other compounds in order of ascending molecular weight are: 1,2-dichloroethane; 1,3-dichloropropane; 1,4-dichlorobutane; 1,5-dichloropentane; and 1,6-dichlorohexane.

A general class of inert organic solvents suitable for my invention is the chlorine substituted aliphatic hydrocarbons of $C_1$ through $C_6$ carbon content which are liquids at room temperature and which are relatively inert to hydrofluoric acid. This group includes monochloro, dichloro, trichloro and tetrachloro substituted aliphatic hydrocarbons. Within this general class, the chlorine substituted saturated aliphatic hydrocarbons of $C_1$ through $C_6$ carbon content which are liquids at room temperature and which are relatively inert to hydrofluoric acid are useful as inert organic solvents in my compositions and processes.

I have also found that trichloroethylene, and tetrachloroethylene, which are chlorine substituted unsaturated hydrocarbons of $C_2$ carbon content, are suitable inert organic solvents useful in my invention.

Suitable inert organic solvents of the general class of chlorine substituted aliphatic hydrocarbons of $C_1$ through $C_6$ carbon atoms include chloroform, carbon tetrachloride, 1,1 - dichloroethane, 1,1 - dichloropropane, 1,2 - dichloropropane, 2,2 - dichloropropane, 1,1,1 - trichloroethane, 1,1,2 - trichloroethane, 1,1,2 - trichloroethylene, perchloroethylene, 1 - chlorobutane, 1,4 - dichlorobutane, 1,2 - dichlorohexane, monochloropentane, 3,4 - dichlorohexane, 1,1 - dichloropentane, 1,2 - dichloropentane, 1,1,3 - trichlorobutane, 1,2,3 - trichlorobutane, 1,2,3-trichloropropane, 1,1,2,2 - tetrachloropropane, 1,1,2,3 - tetrachloropropane and 1,1,1,2-tetrachlorobutane.

Suitable chlorine substituted inert aromatic solvents include, for example, ortho-dichlorobenzene, monochlorobenzene, monochlorotoluene, monochloroxylene and monochloroethylbenzene. Ortho-dichlorobenzene is an excellent organic solvent particularly useful in my invention where a solvent with low volatility is desired. This solvent is highly inert to hydrofluoric acid and also has excellent ability to soften resin coatings.

Suitable inert organic aromatic hydrocarbon solvents include, for example, benzene, toluene, xylene, ethyl benzene, ortho-ethyltoluene, diethyl benzene, isopropyl benzene, and the like. The lower alkyl substituted benzenes boiling at 176° F. or higher are preferred to the lower boiling benzenes because of their higher flash points.

For efficient and rapid removal of the resin coating, it is important to maintain the hydrofluoric acid and solvent in intimate admixture so that the resin coating is brought simultaneously into contact with both the solvent and the HF. Since HF is essentially immiscible with most organic solvents, some means of producing and maintaining the HF and solvent in intimate admixture is necessary. One means of accomplishing this is mechanical agitation of the two-phase mixture of solvent and HF to form an emulsion with or without the use of emulsifying agents. While such emulsions may be employed to give excellent resin stripping results, they suffer from the disadvantage that they tend to settle out in use into separate layers requiring periodic or continuous re-emulsification. They also have the disadvantage that when the solvent and HF are present in a two-phase emulsion, the HF vapor pressure over the mixture is relatively high, producing a relatively high degree of HF fuming, and requiring the use of special hoods and/or ventilating means to eliminate this hazard.

Another means of maintaining an intimate admixture of the HF and solvent is to employ a solvent with which the HF is partially or completely miscible. Such solvents which also meet the other requirements listed above are relatively rare, and are usually rather expensive.

According to a preferred form of the invention, an intimate admixture of HF with HF-immiscible inert organic solvents such as with chlorine substituted hydrocarbons or aromatic hydrocarbons is achieved by employing an organic coupling or solubilizing agent which combines with the HF to form a loosely bound non-ionic adduct which is soluble in the HF-immiscible solvent, permitting the formation of a stable, one-phase system which continuously releases free HF during the resin stripping operation through dissociation of the adduct. This form of the invention has the advantage that it permits the use of low-cost HF-immiscible solvents which are highly effective in their resin-softening action to form stable, intimate solutions of HF with such solvents in which the volatility of the HF is markedly reduced. Such one-phase compositions are at the same time more convenient to use and more effective. Their increased effectiveness is believed due to the fact that the HF is brought into more intimate association with the organic resin-softening solvent than in the case of two-phase emulsion systems. They are more convenient to use since the need for mechanical agitation of the mixture to keep the HF distributed in the solvent is eliminated with the attendant advantage that HF fuming is reduced to a high degree, eliminating the need for elaborate hoods or other means to collect these fumes.

Study of a wide variety of possible solubilizing compounds capable of associating reversibly with HF to form loose adducts soluble in such HF-immiscible solvents, and which release free HF during the resin stripping operation, has led to the discovery that certain Lewis Bases are capable of accomplishing this function. A Lewis Base, in general, is a compound (e.g. ammonia, amines, ethers, ketone, nitro compounds, etc.) capable of donating to an acid an unshared pair of electrons forming a covalent bond. Many Lewis Bases such as ammonia and most amines form tightly bound adducts with the HF which do not dissociate in solution to release free HF and thus are not suitable. A class of Lewis Bases which are preferred are oxygen-containing organic compounds forming such loose dissociable adducts with HF through an unshared pair of electrons of the oxygen atom. Particularly suitable are oxygen-containing organic compounds selected from the class consisting of organic ethers, aromatic compounds containing a phenolic hydroxy group (i.e. compounds containing a hydroxyl group attached directly to the aromatic ring), and organic nitro compounds. Suitable organic ethers include, e.g., halogenated and particularly chlorinated aliphatic organic ethers such as bis(beta-dichloroethyl) ether, cyclic ethers such as 1,4-dioxane. Suitable organic nitro compounds include, for example, nitroalkanes such as nitromethane, nitroethane and nitropropane, and nitro aromatic compounds such as ortho-nitrotoluene and para-nitrotoluene. Suitable aromatic compounds containing a phenolic hydroxy group include, e.g., phenol, the cresols, naphthol, 1,2- and 2,3 - dinitrophenol, 1,3,5 - trinitrophenol and para-benzyloxyphenol. Compositions containing this latter class of solubilizing compounds have special properties and are the subject of a separate application.

All of the above mentioned solubilizing agents are preferably used in amounts ranging from about 0.1 to 2.0 moles of solubilizing agent per mole of hydrofluoric acid with amounts of about 1 mole of solubilizing agent per mole of hydrofluoric acid being most preferred. Obviously, the minimum amount of solubilizing agent will be that amount necessary to place the hydrofluoric acid into solution. Solubilizing agent in excess of 2 moles per mole of hydrofluoric acid may be used if desired since the solubilizing agents are soluble in the inert organic solvents. As indicated above, mixtures of solubilizing agents, as well as the use of a single solubilizer, are useful in the practice of my invention.

The addition of solubilizing agents to hydrofluoric acid-inert organic solvent mixtures does not change the concentration of the hydrofluoric acid needed to remove the resin coatings. Generally, the minimum concentration in the stripping bath will be about 0.05% by weight hydrofluoric acid. As indicated previously, a concentration in the stripping bath of 1.0 to about 10% hydrofluoric acid being most preferred.

On the basis of cost, effectiveness, and availability, dichloromethane is the preferred solvent and bis-beta-dichloroethylether is the preferred solubilizing agent for the anhydrous hydrofluoric acid. Thus, the most preferred compositions of the present invention are from 1.0 to about 10% by weight hydrofluoric acid, with an approximately equal molar quantity of bis-beta-dichloroethylether, and with the remainder of the composition being dichloromethane plus any minor additives which for special needs may be found convenient.

Such additives may include paraffin waxes in order to form thin skins across the surface of the HF-containing formulations and further reduce fuming on contact with moist air, and to reduce evaporation; surfactants to permit the penetration of the formulation into fine crevices and otherwise inaccessible areas and to aid in rinsing; and thickening agents to increase the viscosity for certain specialized uses of the resin-removing formulations. Surfactants and thickening agents for these purposes will be the subject of future applications.

As discussed previously, the valued feature of the hydrofluoric acid-containing compositions of the present invention is their ability to rapidly remove resinous deposits and coatings from substrates, particularly steel, aluminum, and magnesium metals, without harm to the substrate. In certain cases this appears to be due to the passivation of the underlying substrate by the chemically active hydrofluoric acid. However, the passivation effect does not appear to offer a full explanation of the phenomenon and the present invention is in no way dependent upon any hypothesis of the mechanism by which the desired effect is achieved.

A further valuable feature of the action of the compositions of the present invention is that the removal of the paint from the surface is accomplished rapidly in large pieces which easily slough off. This appears to be an entirely different mechanism than that by which many other paint and surface removers function. That is, many other paint removers appear to function by attacking and distintegrating the adherent film into many particles of extremely small size, whereas the formulations of the present invention appear to function by attacking the bond between the adherent resin and the substrate. Since the consumption of a paint remover will be in general proportional to the surface area of the removed coating, the ability of the present compositions to remove coatings in large pieces by attacking the resin-to-substrate bond is important to the economy of the process of the present invention.

Room temperature and atmospheric pressure are preferred for most applications of the invention. An exception to this, as mentioned heretofore, is the use of anhydrous hydrofluoric acid without dilution by solvents which requires the application of pressure or refrigeration below room temperature in order to maintain evaporation within tolerable limits.

In most cases, the liquid phase will be preferred for the process of the present invention, but in certain specialized applications, it may be found convenient to remove adherent resins by condensing the formulation from the vapor phase onto the resin to be removed in a manner similar to that commonly used in vapor phase cleaning.

The compositions of the present invention will preferably be applied to the resin to be removed by dipping the resin-covered substrate into the compositions, or by spraying or flowing the compositions over the resin coating. Brushing and roller coating are less preferred methods which may be used.

Contact time between acid and resin will generally be about 1 to 30 minutes, but is in all cases determined by the length of time required to loosen the resin from the substrate, and is not narrowly critical.

Agitation of either the work piece or the compositions will be preferred in most applications to cause the resinous coatings to slough off with minimum expenditure of hydrofluoric acid values.

The clean substrates should be rinsed immediately in an inert organic solvent, in rapidly running water or in alkaline solution. Parts covered with the compositions of the present invention should never be permitted to stand for long in contact with moist air since they may absorb moisture and form aqueous hydrofluoric acid which will attack most substrates.

It will be understood that the method of the present invention is capable of removing from surfaces, adherent resins of a wide variety of chemical compositions, including the great majority of commercially available coating materials, foams, encapsulating compounds, and glues. Because of their wide commercial use, and the ability of the compositions of the present invention to readily remove them, resins of the following compositions are especially susceptible to removal by practice of the present invention: epoxies, urethanes, phenolics, polycarbonates, polyesters, acrylics, neoprenes, silicon elastomers, nylons, polyvinyl chlorides, polyvinyl alcohols, and copolymers of the above.

By urethanes is meant resins which are based on polymerized ethyl carbamate and which therefore contain repeating units having the structure —NCO—.

By phenolics is meant resins made from phenols, including phenol, m-cresol, p-cresol, resorcinol, and similar compounds; and generally produced by condensation with an aldehyde including formaldehyde, acetaldehyde, benzaldehyde, and furfuraldehyde.

By acrylics is meant resins formed by the polymerization of monomeric derivatives of acrylic acid or of alpha methyl acrylic acid or of other homologs of acrylic acid.

By nylon is meant any long chain synthetic polymeric amide having recurring amide groups as an integral part of the main polymer chain.

By neoprenes are meant those elastomeric type polymers which are basically polymers of chloroprene.

By polyvinyl chloride is meant polymers derived substantially from vinyl chloride.

By polyester resins is meant those produced by the polymerization of long chain poly basic acids, including sebacic, with polyhydric alcohols including glycol and glycerine with or without simultaneous polymerization of an admixed compound such as styrene.

By silicone elastomers is meant polymers built on a structure of alternate silicon and oxygen atoms with various organic groups attached to the unsaturated valences of the silicon atoms. The polymers may be cyclic, linear or cross linked in a wide variety of molecular weights including materials known commercially as silicone rubbers.

By epoxies is meant resins produced by the polymerization of an epoxide, including such compounds as ethylene oxide and epichlorohydrin, particularly with a diphenol. The chemical structure of epoxy resins is characterized by 3-membered rings consisting of two carbon atoms and 1 oxygen atom.

By polycarbonates is meant those polymers which are characterized by a substantial number of —O—CO—O— groups in the molecule.

Whenever my stripping baths become low in hydrofluoric acid, it is convenient to fortify them with a concentrate in which the hydrofluoric acid concentration can be as high as forty percent by weight with the balance being inert organic solvents of the types described above and Lewis Base oxygen containing solubilizing agents for the hydrofluoric acid as described above. In these concentrates the mole ratio of solubilizing agent to hydrofluoric acid will also vary within the range of 0.1 to 2.0. A particularly useful concentrate contains anhydrous hydrofluoric acid—25% by weight, methylene chloride—25% by weight and bis, beta-dichloroethyl ether—50% by weight. Substitution of the dichloroethyl ether by phenol provides another particularly effective concentrate.

The following examples are illustrative of my invention:

EXAMPLE 1

Formulations of the present invention consisting of 0.1% by weight of anhydrous hydrofluoric acid, and an equimolar quantity of bis, -beta-dichloroethylether, with the remainder being dichloromethane, strip the following paint systems from aluminum, magnesium and steel substrates in from one to about 30 minutes:

Epoxy primer (the primer tested was that designated "FR" by the Douglas Aircraft Co.)

Epoxy primer plus epoxy top coat (the system tested was that designated "BMS 10–11" by the Boeing Aircraft Co.)

Polyurethane coating system (applied in conformance with MIL–P–27316, and MIL–C–27227, both specifications of the U.S. Government)

Highly resistant enamel system (according to U.S. Government Specification MIL–E–7729)

Lacquer system (according to U.S. Government Specification MIL–L–7178)

The substrates are not appreciably corroded in any case. All of the above 5 test systems are highly resistant to commercial paint strippers and the first three (the epoxy primer, the epoxy primer plus topcoat, and the polyurethane system) are barely softened by several hours' exposure to even the most powerful of the commercially available paint strippers.

EXAMPLES 2 TO 8

United States Government Specification MIL–R–25134 outlines a standard procedure used for measuring the effect of paint stripping agents on substrates. The specification requires that 1″ x 2″ test panels of substrate materials be immersed in paint strippers for seven days at 100° F. When the compositions of the present invention are prepared as described below, the corresponding weight losses are as listed in the table. (None of these is considered to constitute appreciable corrosion.)

EXAMPLE 9

When mild steel panels are treated as described in Examples 2 through 8 with the formulations of Examples 2 through 8, the weight losses in every case are less than 0.0008 gram which is not considered appreciable corrosion.

EXAMPLE 10

Two strips of aluminum are coated with a two-component epoxy type glue mixed according to the manufacturer's directions and then joined together to form a lap joint. The assembly is baked to harden the joint and on removal from the oven the strips cannot be separated manually.

The assembly consisting of the two strips is completely immersed in an anhydrous formulation consisting of dichloromethane, phenol and hydrofluoric acid. After immersion for several hours and subsequent rinsing in $C_2H_4Cl_2$, the joint is readily manually sheared.

EXAMPLE 11

A polyurethane foam sandwich panel consisting of foam laid between two sheets of magnesium is completely immersed in a formulation consisting essentially of hydrofluoric acid, dichloromethane and bis-beta-chloroethyl ether. After approximately 24 hours the foam is substantially disintegrated and is easily removed from the aluminum strips by agitation. The aluminum surfaces are not appreciably corroded after being rinsed in $C_2H_4Cl_2$.

EXAMPLE 12

Films of the below listed resins supported on metallic substrates are removed by immersion for less than one hour in anhydrous hydrofluoric acid at room temperature followed by thorough rinsing with running water. The metallic substrates are not appreciably corroded.

TABLE 1

| Example | Formula | Weight Loss, 7 days at 100° F. (grams) | | |
|---|---|---|---|---|
| | | 24 S-Alum. | 2 S-Alum. | Magnesium |
| 2 | 250 ml. $C_2H_4Cl_2$<br>35 ml. AHF<br>115 ml. $(ClC_2H_4)_2O$<br>15 g. paraffin wax<br>20 g. acetylene black | .0000 | +.0003 | .0000 |
| 3 | 425 ml. $C_2H_4Cl_2$<br>37.5 ml. AHF<br>37.5 ml. $(ClC_2H_4)_2O$<br>20 g. paraffin wax<br>20 g. acetylene black | +.0003 | +.0005 | .0000 |
| 4 | 475 ml. $C_2H_4Cl_2$<br>5 ml. AHF<br>20 ml. $(ClC_2H_4)_2O$<br>25 g. paraffin wax<br>22.5 g. acetylene black | −.0003 | .0000 | +.0002 |
| 5 | 425 ml. $C_2H_4Cl_2$<br>37.5 ml. AHF<br>37.5 ml. $(ClC_2H_4)_2O$ | +.0003 | +.0008 | +.0001 |
| 6 | 99 ml. $CH_2Cl_2$<br>1 ml. AHF<br>2 ml. $(ClC_2H_4)_2O$ | | | |
| 7 | 97 ml. $CH_2Cl_2$<br>3 ml. AHF<br>4 ml. $(ClC_2H_4)_2O$ | | | |
| 8 | 95 ml. $CH_2Cl_2$<br>1 ml. AHF<br>4 ml. $(ClC_2H_4)_2O$ | | | |

Resin: Manufacturer and trade name
- Acrylic _____ Du Pont (Lucite)
- Neoprene _____ U.S. Rubber
- Nylon _____ Du Pont
- Polycarbonate _____ Vondelingenplaat, Netherlands
- Polyvinyl alcohol __ Du Pont
- Polyvinyl chloride _ B. F. Goodrich Co.
- Silicone Elastomer _ Dow Chemical (Silastic)
- Silicone Rubber ____ General Electric
- Polyester _____ Du Pont (Mylar)
- Acrylic _____ Pennsalt Chemicals (Hinac)
- Phenolic _____ Union Carbide (Bakelite)

EXAMPLE 13

The following resin stripping solutions and emulsions were prepared by first placing the inert organic solvent in a polyethylene lined beaker to which the solubilizing agent was added if used. Mechanical agitation placed the solvent and solubilizer in solution and to this was added weighed amounts of liquid anhydrous hydrofluoric acid. There was a pronounced initial acid fuming which gradually was reduced to a minimum as solution of the hydrofluoric acid took place in the agitated inert organic solvent-solubilizer system. Solution generally took place in from ¼ to five minutes. After the hydrofluoric acid fuming had considerably dropped off, stirring was discontinued.

Anodized aluminum strips which were previously coated with a baked Sherwin-Williams epoxy primer Aero Caticoat System were immersed in stripping compositions prepared in the manner described above. The time required to strip the epoxy coating is noted in the table. The epoxy coated substrates were placed in the stripping compositions at room temperature, i.e., 70 to 75° F., and the coated substrates were closely observed until the resin coatings were substantially removed and floated to the surface. The tests are set forth in Table 2.

TABLE 2

| Test No. | Anhydrous HF, Percent by Wt. | Inert Organic Solvents | Percent by Wt. | Solubilizers | Percent by Wt. | Stripping Time |
|---|---|---|---|---|---|---|
| 1 | 0.1 | Methylene Chloride | 99.9 | | | 1 hour. |
| 2 | 4 | Orthodichlorobenzene | 88 | Beta Naphthol | 8 | 1 minute. |
| 3 | 4 | 1,1,2-trichlorethane | 88 | Mixture of Metacresol and Paracresol | 8 | Do. |
| 4 | 4 | 1,2,3-trichlorpropane | 88 | Phenol | 8 | 2 minutes. |
| 5 | 2 | Methylene Chloride | 97 | do | 1 | Instantly. |
| 6 | 1 | do | 89.5 | do | 9.5 | 10–15 minutes. |
| 7 | 4 | Benzene | 88 | Mixture of Metacresol and Paracresol | 8 | 2 minutes. |
| 8 | 4 | Xylene | 96 | | | 3 minutes. |
| 9 | 25 | Methylene Chloride | 50 | Phenol | 25 | Instantly. |
| 10 | 50 | do | 25 | do | 25 | Do. |
| 11 | 75 | do | 15 | do | 10 | Do. |
| 12 | 4 | {Methylene Chloride / Perchlorethylene} | 44 / 44 | do | 8 | 2 minutes. |

In none of the above tests was there any noticeable corrosion of the substrates.

EXAMPLE 14

Using the procedure set forth in Example 13, the efficiency of anhydrous hydrofluoric acid stripping compositions was tested against aluminum first coated with Alodine 1200 and then with Sherwin Williams epoxy Aero-Coat Primer at 75° F. The results are shown in Table 3.

TABLE 3

| Test No. | Anhydrous HF, Percent by Wt. | Inert Organic Solvents | Percent by Wt. | Solubilizers | Percent by Wt. | Observations |
|---|---|---|---|---|---|---|
| 1 | 0.05 | Carbon tetrachloride | 98.95 | Phenol | 1.0 | Paint softened in 3 hours—some blistering at air interface. |
| 2 | 1.0 | Chloroform | 94.0 | Metaparacresol | 5.0 | Strips in 4 minutes. Paint lifted from surface of panel. |
| 3 | 1.0 | 1,5-dichloropentane | 94.0 | Phenol | 5.0 | Strips in 12 minutes. Paint blistered. |
| 4 | 10.0 | {1,1-trichlorethane / Methylene chloride} | 50.0 / 20.0 | do | 20.0 | Strips instantly. Paint lifted from surface of panel. |
| 5 | 4.0 | Perclorethylene | 88.0 | do | 8.0 | Strips instantly—paint lifted from surface of panel. No apparent reaction occurs when AHF added to mixture. |
| 6 | 10.0 | Amyl chloride (mixture of 1-, 2- and 3-chloropentane). | 75.0 | {Metaparacresol / Betanaphthol} | 10.0 / 5.0 | Strips in 1 minute. Blistering of paint is evident. |
| 7 | 0.05 | Orthodichlorobenzene | 84.95 | {Phenol / Bis, betadichloroethyl ether} | 5.0 / 10.0 | Strips in 6 hours, blistering. |
| 8 | 10.0 | {Orthodichlorobenzene / Carbon tetrachloride} | 35.0 / 40.0 | Bis, beta dichloroethyl ether / Beta-naphthol | 5.0 / 10.0 | Strips instantly. Paint lifted from surface of panel. |
| 9 | 1.0 | 1,4-dichlorobutane | 94.0 | Phenol | 5.0 | Strips in 4 minutes. Paint lifted from surface of panel. |
| 10 | 4.0 | Trichlorethylene | 88.0 | do | 8.0 | Strips instantly. Paint lifted from surface of panel. |

EXAMPLE 15

Panels for testing the efficiency of stripping formulations were prepared by allodizing aluminum, treating magnesium panels with Dow 7 chromate conversion coating, and treating carbon steels with a zinc phosphating solution. All metal finishes being applied in the conventional manner. Panels of each type were then coated with Desoto Chemical Co. epoxy Super Koropon fluid resistant primer #910–014 after which Desoto Chemical Co. epoxy fluid resistant top coat #521–002 was applied. Each coat was air dried for 72 hours followed by baking at 200° F. for 48 hours. The resin stripping compositions in the table below were prepared by the same procedure used in Example 13. One panel each of the aluminum, magnesium and steel panels treated and coated as described above were then immersed in each of the stripping compositions at room temperature and closely observed until the coating was removed. In all cases this took place in less than thirty minutes. After stripping, the test panels were rinsed thoroughly in water and dried. Inspection of all of the panels failed to reveal any evidence of corrosion. The tests are set forth in Table 4.

sist essentially of an intimate mixture of hydrofluoric acid and at least one inert organic solvent selected from the group consisting of chlorine substituted hydrocarbons, benzene, and lower alkyl substituted benzenes in which mixture the concentration of the hydrofluoric acid will vary from 0.05 to 75% by weight, and thereafter removing the said stripping composition and loosened resin from the substrate.

2. The method of claim 1 in which the inert organic solvent is an alpha omega dichloroalkane of one through six carbon atoms.

3. The method of claim 1 in which at least one solubilizing agent selected from the group consisting of bis (beta-dichloroethyl) ether, 1,4-dioxane, nitromethane, nitroethane, nitropropane, ortho-nitrotoluene and para-nitrotoluene is added to the stripping composition in sufficient quantity to form a solution of the hydrofluoric acid.

4. The method of claim 1 in which the concentration of the hydrofluoric acid in the stripping composition mixture varies from 1 to 10% by weight.

TABLE 4

| Test No. | Stripping Composition ||||||
|---|---|---|---|---|---|---|
| | Anhydrous HF, Percent by Wt. | Inert Organic Solvents | Percent by Wt. | Solubilizers | Percent by Wt. | Additive | Percent by Wt. |
| 1 | 4 | Methylene Chloride | 64 | 2-nitropropane / Parabenzyloxyphenol | 15 / 10 | Wax | 7 |
| 2 | 4 | do | 64 | Paranitrophenol / 2-nitropropane | 10 / 15 | Wax | 7 |
| 3 | 4 | do | 62 | 2,4-dinitrophenol / 2-nitropropane | 22 / 5 | Wax | 7 |
| 4 | 4 | do | 62 | 2-nitropropane / Picric acid | 15 / 12 | Wax | 7 |

It should be understood that the invention is adaptable to a wide range of modifications and variations and that the preceding examples are intended only to illustrate the invention and are not to restrict it in any manner or to any degree.

I claim:

1. The method of removing an adherent resin from a substrate without appreciable corrosion of the substrate by contacting the said resin for a time sufficient to loosen the resin with a substantially anhydrous stripping composition of which the principal stripping ingredients con-

References Cited
UNITED STATES PATENTS

| 2,279,267 | 4/1941 | Kremers | 134—38 |
| 2,737,499 | 3/1956 | Grubb | 252—38 |
| 3,072,579 | 4/1965 | Newman | 252—143 |
| 3,179,609 | 4/1965 | Morison | 134—38 |

FOREIGN PATENTS 834,707  5/1960  Great Britain.

LEON D. ROSDOL, *Primary Examiner.*
W. E. SCHULZ, *Assistant Examiner.*